US011003031B2

United States Patent
Morinaga et al.

(10) Patent No.: US 11,003,031 B2
(45) Date of Patent: May 11, 2021

(54) DISPLAY APPARATUS

(71) Applicant: Sharp Kabushiki Kaisha, Sakai (JP)

(72) Inventors: Junichi Morinaga, Sakai (JP);
Hiroyuki Ohgami, Sakai (JP);
Takahiro Koshiba, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/799,989

(22) Filed: Feb. 25, 2020

(65) Prior Publication Data
US 2020/0272000 A1 Aug. 27, 2020

(30) Foreign Application Priority Data

Feb. 26, 2019 (JP) .............................. JP2019-032994

(51) Int. Cl.
| | |
|---|---|
| *G02F 1/1343* | (2006.01) |
| *G02F 1/1362* | (2006.01) |
| *G02F 1/1335* | (2006.01) |
| *G02F 1/1337* | (2006.01) |

(52) U.S. Cl.
CPC .. *G02F 1/134363* (2013.01); *G02F 1/133512* (2013.01); *G02F 1/133711* (2013.01); *G02F 1/136227* (2013.01)

(58) Field of Classification Search
CPC ......... G02F 1/134363; G02F 1/136227; G02F 1/133512; G02F 1/133711
USPC .............................................. 349/38–39, 141
See application file for complete search history.

(56) References Cited

U.S. PATENT DOCUMENTS

| | | |
|---|---|---|
| 6,512,564 B1 | 1/2003 | Yoshida et al. |
| RE44,181 E | 4/2013 | Kim |
| RE45,187 E | 10/2014 | Kim |
| RE46,035 E | 6/2016 | Kim |
| RE47,431 E | 6/2019 | Kim |
| 2003/0112394 A1 | 6/2003 | Yoshida et al. |
| 2004/0233365 A1 | 11/2004 | Yoshida et al. |
| 2007/0024784 A1 | 2/2007 | Yoshida et al. |
| 2007/0057257 A1 | 3/2007 | Kim |
| 2008/0309862 A1 | 12/2008 | Yoshida et al. |

(Continued)

FOREIGN PATENT DOCUMENTS

| | | |
|---|---|---|
| JP | 11-133429 A | 5/1999 |
| JP | 2007-079568 A | 3/2007 |

(Continued)

*Primary Examiner* — Charles S Chang
(74) *Attorney, Agent, or Firm* — Keating & Bennett, LLP

(57) ABSTRACT

A display apparatus includes: a pixel electrode; a switching element that is connected to the pixel electrode; a scanning line that transfers a signal by which the switching element is driven; an image line that transfers a signal by which the pixel electrode is charged; a liquid crystal layer that includes liquid crystal molecules; a plurality of domains that are different in alignment direction of the liquid crystal molecules when a voltage is applied to the liquid crystal layer; an alignment boundary portion that is positioned in a boundary of the plurality of domains; an alignment film that aligns the liquid crystal molecules, and a capacitor line that extends along the transverse direction and is arranged so as to be overlapped with the pixel electrode with an insulating film in between and overlapped with at least a part of the alignment boundary portion.

19 Claims, 9 Drawing Sheets

(56) References Cited

U.S. PATENT DOCUMENTS

| | | |
|---|---|---|
| 2008/0309863 A1 | 12/2008 | Yoshida et al. |
| 2008/0316408 A1 | 12/2008 | Yoshida et al. |
| 2008/0316409 A1 | 12/2008 | Yoshida et al. |
| 2009/0284703 A1 | 11/2009 | Shoraku et al. |
| 2010/0321622 A1 | 12/2010 | Yoshida et al. |
| 2010/0328602 A1 | 12/2010 | Yoshida et al. |
| 2012/0088195 A1 | 4/2012 | Yoshida et al. |
| 2012/0154723 A1* | 6/2012 | Chang ............... G02F 1/133753 349/106 |
| 2012/0307172 A1 | 12/2012 | Yoshida |
| 2015/0227008 A1 | 8/2015 | Yoshida |

FOREIGN PATENT DOCUMENTS

| | | |
|---|---|---|
| WO | 2006/132369 A1 | 12/2006 |
| WO | 2011/096390 A1 | 8/2011 |

\* cited by examiner

DISPLAY APPARATUS

BACKGROUND

1. Field

The present disclosure relates to a display apparatus.

2. Description of the Related Art

As an example of liquid crystal display apparatuses in the related art, one described in International Publication No. 2006/132369 is known. The liquid crystal display apparatus described in International Publication No. 2006/132369 has a vertical alignment liquid crystal layer, a first substrate, a second substrate, a first electrode provided on the first substrate so as to face the liquid crystal layer, a second electrode provided on the second substrate so as to face the liquid crystal layer, and at least one alignment film provided in contact with the liquid crystal layer. A pixel region has a first liquid crystal domain in which liquid crystal molecules are tilted in a predetermined first direction around a center of a plane of the liquid crystal layer and a middle of the liquid crystal layer in a thickness direction when a voltage is applied. The first liquid crystal domain is close to at least a part of an edge of the first electrode, and at least the part includes a first edge portion in which an azimuthal direction that is perpendicular to the part and points toward an inside of the first electrode defines an angle greater than 90° with respect to the first direction. Either the first substrate or the second substrate has a light shielding member that includes a first light shielding portion for selectively shielding at least a part of the first edge portion from light.

In the liquid crystal display apparatus described in International Publication No. 2006/132369, a CS bus line that forms a storage capacitor with a pixel electrode is described, and the CS bus line extends in parallel to a gate bus line and is configured to cross a source bus line. Meanwhile, in recent years, in order to reduce the installation number of source bus lines, a configuration in which a gate bus line extends along a longitudinal direction of a pixel electrode having a longitudinal shape and a source bus line extends along a transverse direction of the pixel electrode has been adopted in some cases. According to such a configuration, since the installation number of gate bus lines tends to increase, the number of places where the source bus line crosses the gate bus line increases, thus posing a problem that a greater load is applied to the source bus line due to parasitic capacitance generated between the source bus line and the gate bus line. In such a configuration, when the CS bus line extends in parallel to the gate bus line as described in International Publication No. 2006/132369, not only the gate bus line but also the CS bus line crosses the source bus line, so that it is concerned that a much greater load is applied to the source bus line and signal delay is caused.

An aspect of the disclosure is completed on the basis of circumstances as described above and reduces signal delay of an image line.

SUMMARY

According to an aspect of the disclosure, a display apparatus includes: a pixel electrode that has a longitudinal shape; a switching element that is connected to the pixel electrode; a scanning line that extends along a longitudinal direction of the pixel electrode and is connected to the switching element to transfer a signal by which the switching element is driven; an image line that extends along a transverse direction of the pixel electrode and is connected to the switching element to transfer a signal by which the pixel electrode is charged; a liquid crystal layer that includes liquid crystal molecules; a plurality of domains that are different in alignment direction of the liquid crystal molecules when a voltage is applied to the liquid crystal layer; an alignment boundary portion that is positioned in a boundary of the plurality of domains; an alignment film that aligns the liquid crystal molecules, and a capacitor line that extends along the transverse direction and is arranged so as to be overlapped with the pixel electrode with an insulating film in between and overlapped with at least a part of the alignment boundary portion.

DESCRIPTION OF THE EMBODIMENTS

Embodiment 1

Figure 1:
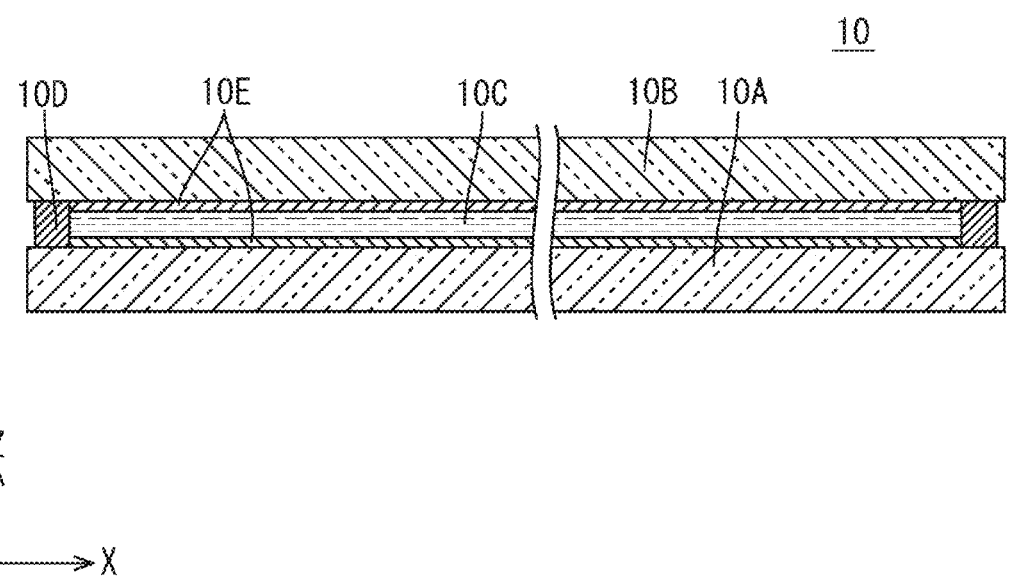
FIG. 1 is a sectional view of a liquid crystal panel according to Embodiment 1 of the disclosure.

Embodiment 1 of the disclosure will be described with reference to FIGS. 1 to 8. The present embodiment exemplifies an array substrate 10A that constitutes a liquid crystal panel (display apparatus) 10. Note that, an X-axis, a Y-axis, and a Z-axis are illustrated at a part of each of drawings and X-axis, Y-axis, and Z-axis directions represent directions illustrated in the drawings. An upper side and a lower side in FIGS. 1, 3, 4, and 5 are respectively defined as a front side and a back side.

FIG. 1 is a schematic sectional view of the liquid crystal panel 10. As illustrated in FIG. 1, the liquid crystal panel 10 includes the array substrate 10A, a CF substrate (facing substrate) 10B arranged so as to face the array substrate 10A, a liquid crystal layer 10C interposed between both the substrates 10A and 10B, a seal portion 10D that surrounds and seals the liquid crystal layer 10C, and a pair of alignment films 10E that is provided in innermost surfaces of the pair of substrates 10A and 10B so as to face the liquid crystal layer 10C. Respective polarizers are attached to outer surface sides of both the substrates 10A and 10B.

Figure 2:
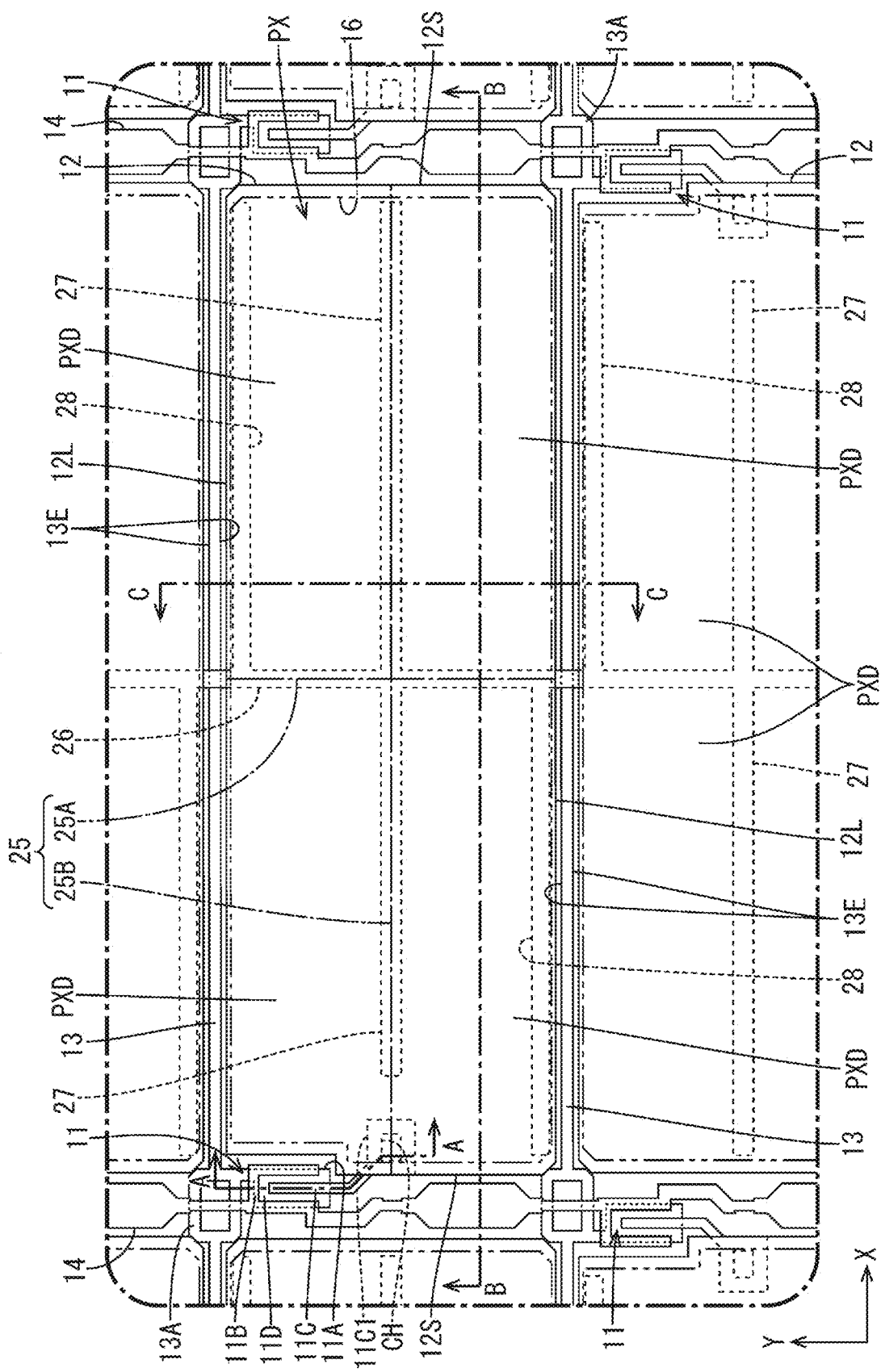
FIG. 2 is a plan view illustrating a pixel array in an array substrate constituting the liquid crystal panel.

The liquid crystal panel 10 has a display surface divided into a display region where an image is able to be displayed and a non-display region surrounding the display region. FIG. 2 is a plan view illustrating a pixel array in the display region of the array substrate 10A. Note that, FIG. 2 also illustrates a part of a configuration of the CF substrate 10B. In the display region of the array substrate 10A, as illustrated in FIG. 2, a plurality of TFTs (switching elements, thin film transistors) 11 and a plurality of pixel electrodes 12 connected to the TFTs 11 are provided in line in a matrix form (in rows and columns) along the X-axis direction and the Y-axis direction. Gate lines (scanning lines) 13 and source lines (image lines, data lines) 14, which form a substantially grid pattern, are arranged so as to surround the TFTs 11 and the pixel electrodes 12. Each of the TFTs 11 has at least a gate electrode 11A connected to a gate line 13, a source electrode 11B connected to a source line 14, and a drain electrode 11C connected to a pixel electrode 12. The TFT 11 is located on a left side or on a right side illustrated in FIG. 2 in the X-axis direction relative to the pixel electrode 12 (source line 14). The TFT 11 located on the left side relative to the pixel electrode 12 (source line 14) and the TFT 11 located on the right side relative to the pixel electrode 12 (source line 14) are alternately and repeatedly arrayed in the Y-axis direction and in a zigzag (staggered) manner in plan view. Note that, a gate circuit portion that supplies a scanning signal to the gate line 13 is desired to be monolithically provided in the array substrate 10A. Moreover, a driver that supplies an image signal to the source line 14 is mounted on the array substrate 10A by a COG (Chip On Glass) method.

As illustrated in FIG. 2, the pixel electrode 12 has a horizontally-long longitudinal shape in plan view, specifically, a substantially rectangular shape, and a longitudinal direction coincides with the X-axis direction and a transverse direction coincides with the Y-axis direction. A ratio of a longitudinal dimension to a transverse dimension in the pixel electrode 12 is, for example, about 3. While the gate line 13 is interposed between pixel electrodes 12 adjacent to each other in the transverse direction (Y-axis direction), the source line 14 is interposed between pixel electrodes 12 adjacent to each other in the longitudinal direction (X-axis direction). The pixel electrode 12 is arranged so as not to be overlapped with the gate line 13 or the source line 14 in plan view. The gate line 13 extends along the longitudinal direction (X-axis direction) of the pixel electrode 12 and a plurality of gate lines 13 are arranged in line with an interval of almost the transverse dimension of the pixel electrode 12 in the transverse direction. Each of the gate lines 13 has a portion (hereinafter, referred to as an annular portion 13A) forming a horizontally-long quadrilateral annular shape in plan view at a crossing portion with each of the source lines 14. In a case where a defect of short-circuit between the gate line 13 and the source line 14 is caused at the crossing portion of the gate line 13 and the source line 14, the annular portion 13A is able to separate a short-circuit portion from the gate line 13 by laser radiation or the like. The installation number of gate lines 13 coincides with the number of pixel electrodes 12 arranged in the Y-axis direction. The source line 14 extends along the transverse direction of the pixel electrode 12 and a plurality of source lines 14 are arranged in line with an interval of almost the longitudinal dimension of the pixel electrode 12 in the longitudinal direction. The source line 14 is almost orthogonal to (crossing) the gate line 13. The installation number of source lines 14 coincides with the number of pixel electrodes 12 arranged in the X-axis direction. According to such a configuration, as compared to a case where the pixel electrode is assumed to have a vertically-long longitudinal shape, an interval at which the source lines 14 are arranged almost corresponds to a ratio (for example, about 1/3) obtained by dividing the transverse dimension of the pixel electrode 12 by the longitudinal dimension thereof, and, accordingly, the installation number of source liens 14 per unit length in the X-axis direction almost corresponds to a ratio (for example, about 1/3) similar to the above. Note that, as compared to the case where the pixel electrode is assumed to have a vertically-long longitudinal shape, an interval at which the gate lines 13 are arranged almost corresponds to a ratio (for example, about 3) obtained by dividing the longitudinal dimension of the pixel electrode 12 by the transverse dimension thereof, and, accordingly, the installation number of gate lines 13 per unit length in the X-axis direction almost corresponds to a ratio (for example, about 3) similar to the above. This makes it possible to reduce the installation number of source lines 14, so that the number of image signals to be supplied to the source lines 14 is reduced. As a result, since the installation number of drivers that supply signals to the source lines 14 is able to be reduced and an inexpensive driver is able to be used, it is possible to achieve a narrow frame and cost reduction of the liquid crystal panel 10 even when improvement of definition of the liquid crystal panel 10 progresses.

Figure 3:
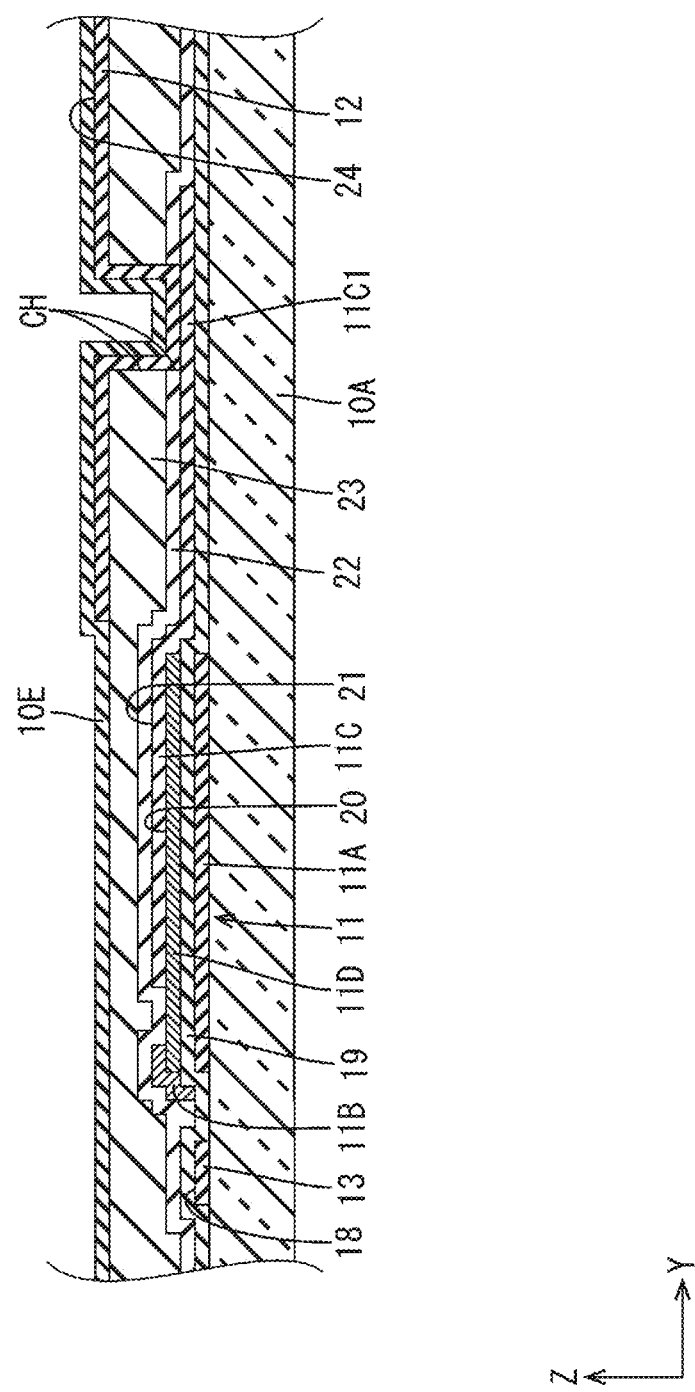
FIG. 3 is a sectional view of the array substrate taken along a line III-III of FIG. 2.

FIG. 3 is a sectional view of the array substrate 10A taken along a line III-III of FIG. 2. A configuration of the TFT 11 will be described in detail with reference to FIGS. 2 and 3. As illustrated in FIGS. 2 and 3, the TFT 11 is arranged so as to be adjacent to the pixel electrode 12, which is to be connected, on a left side or a right side illustrated in FIG. 2 in the X-axis direction. The TFT 11 has the gate electrode 11A continued to the gate line 13. The gate electrode 11A is branched so as to protrude downwardly as illustrated in FIG. 2 from the annular portion 13A in the gate line 13 and has a vertically-long quadrilateral shape in plan view. The TFT 11 has the source electrode 11B continued to the source line 14. The source electrode 11B forms a channel shape that is bent along three sides of the gate electrode 11A and is opened toward a lower side illustrated in FIG. 2 in plan view. The TFT 11 has the drain electrode 11C arranged at a position separated from the source electrode 11B. The drain electrode 11C is opposed to three side portions of the source electrode 11B and extends from an opening portion of the source electrode 11B along the Y-axis direction so that an end thereof is overlapped with a part of the pixel electrode 12 in plan view and connected to the part. That is, the drain electrode 11C has a pixel connection portion 11C1 connected to the pixel electrode 12. The TFT 11 has a channel portion 11D that is overlapped with the gate electrode 11A and connected to the source electrode 11B and the drain electrode 11C. The channel portion 11D has a quadrilateral shape in plan view similarly to the gate electrode 11A and has three side portions connected to the source electrode 11B and a portion including the other one side portion connected to the drain electrode 11C. Further, when a scanning signal transferred to the gate line 13 is supplied to the gate electrode 11A so that the TFT 11 is driven, an image signal (data signal) transferred to the source line 14 is supplied from the source electrode 11B to the drain electrode 11C through the channel portion 11D. As a result, the pixel electrode 12 is charged to a potential according to the image signal.

Figure 4:
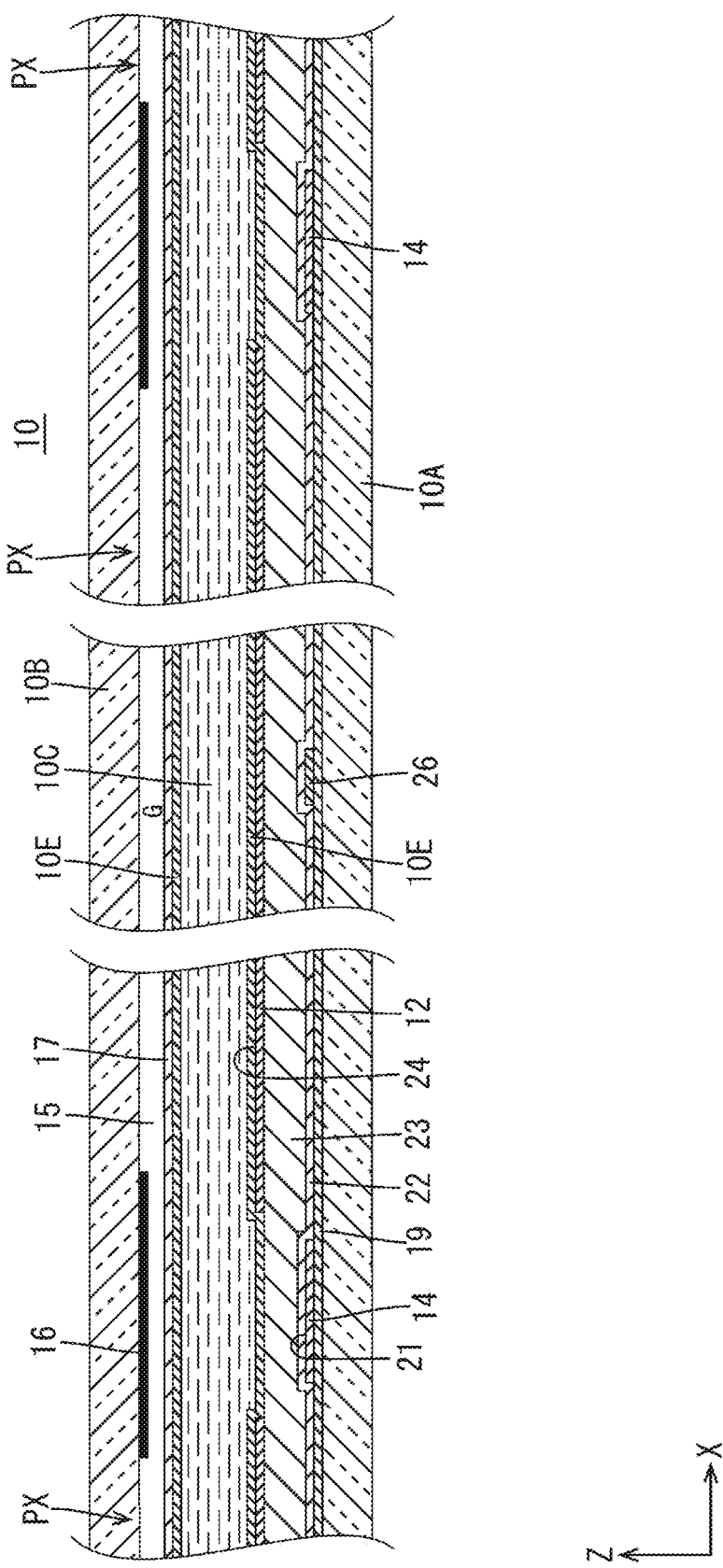
FIG. 4 is a sectional view of the liquid crystal panel taken along a line IV-IV of FIG. 2.
Figure 5:
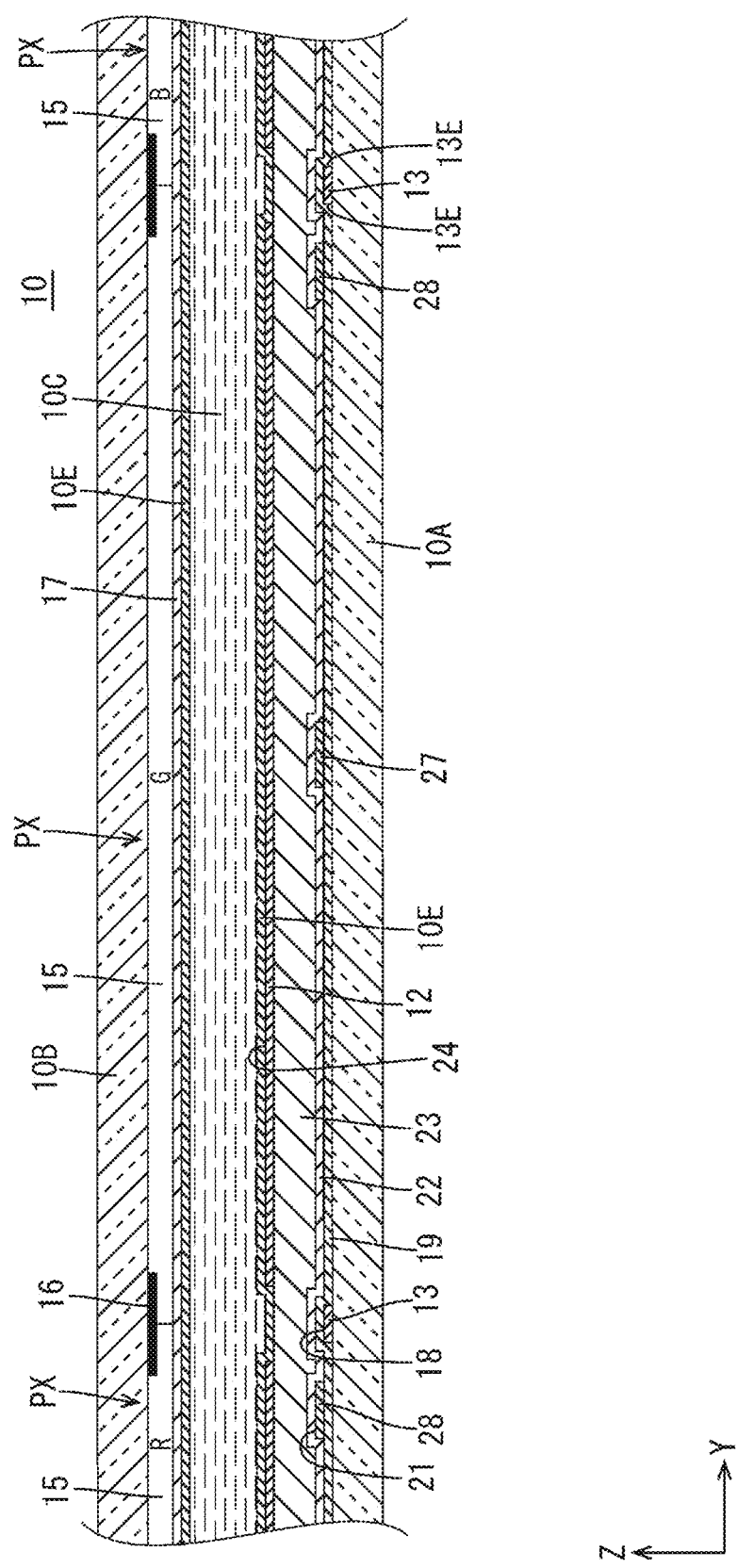
FIG. 5 is a sectional view of the liquid crystal panel taken along a line V-V of FIG. 2.

FIG. 4 is a sectional view of the liquid crystal panel 10 taken along a line IV-IV of FIG. 2 and FIG. 5 is a sectional view of the liquid crystal panel 10 taken along a line V-V of FIG. 2. In a display region of the CF substrate 10B, three color filters 15 representing blue (B), green (G), and red (R) are provided as illustrated in FIGS. 4 and 5. A plurality of color filters 15 are arrayed in line in a matrix form in each of the X-axis direction and the Y-axis direction so as to be overlapped with the respective pixel electrodes 12 on the array substrate 10A side in plan view. The color filters 15 representing different colors are repeatedly arranged along the source lines 14 (Y-axis direction) and the color filters 15 representing the same color are continuously arranged along the gate lines 13 (X-axis direction). In the liquid crystal panel 10, the color filters 15 of R, G, and B arranged along the Y-axis direction and three pixel electrodes 12 facing the respective color filters 15 form pixel portions PX of three colors. Further, in the liquid crystal panel 10, the pixel portions PX of three colors R, G, and B adjacent to one another along the Y-axis direction form a display pixel capable of color display in predetermined tone. In the display region of the CF substrate 10B, a black matrix (inter-pixel light shielding portion) 16 that has a substantially grid pattern so as to separate the adjacent color filters 15 is provided. The black matrix 16 makes light difficult to travel between the adjacent pixel portions PX, so that color mixture or the like is suppressed. A facing electrode 17 is formed on inner surface sides of the color filters 15. The facing electrode 17 is provided in a solid state at least in the display region and faces all the pixel electrodes 12 with the liquid crystal layer 10C held therebetween. When a reference potential (common potential) is supplied to the facing electrode 17, a potential difference is generated between the facing electrode 17 and the pixel electrodes 12 charged by the TFTs 11. An alignment state of liquid crystal molecules of the liquid crystal layer 10C changes in accordance with the potential difference, so that predetermined tone display is able to be performed for each of the pixel portions PX. It is desirable that an overcoat film for flattening is formed between the color filters 15 and the facing electrode 17.

The array substrate 10A has various films formed in layers on an inner surface side of a glass substrate (substrate) as illustrated in FIGS. 3 to 5. Specifically, the array substrate 10A has a first metal film (conductor film, gate metal film) 18, a gate insulating film (first insulating film) 19 arranged on an upper layer side of the first metal film 18, a semiconductor film 20 arranged on an upper layer side of the gate insulating film 19, a second metal film (conductor film, source metal film) 21 arranged on an upper layer side of the semiconductor film 20, an inter-layer insulating film (insulating film, second insulating film) 22 arranged on an upper layer side of the second metal film 21, a flattening film (insulating film, third insulating film) 23 arranged on an upper layer side of the inter-layer insulating film 22, a transparent electrode film 24 arranged on an upper layer side of the flattening film 23, and an alignment film 10E arranged on an upper layer side of the transparent electrode film 24.

Each of the first metal film 18 and the second metal film 21 is a single layer film made of one kind of metal material or a laminated film made of different kinds of metal materials or alloy and thus has conductivity and a light shielding property. The first metal film 18 forms the gate lines 13, gate electrodes 11A of the TFTs 11, and the like as illustrated in FIGS. 3 to 5. The second metal film 21 forms the source lines 14, source electrodes 11B of the TFTs 11, and the like. The semiconductor film 20 is an oxide semiconductor film using a material of, for example, oxide semiconductor. The semiconductor film 20 forms channel portions 11D of the TFTs 11 and the like. The transparent electrode film 24 is made of a transparent electrode material, for example, such as ITO (Indium Tin Oxide) or IZO (Indium Zinc Oxide), and forms the pixel electrodes 12 and the like.

Each of the gate insulating film 19 and the inter-layer insulating film 22 is made of $SiO_2$ (oxide silicon, silicon oxide), $SiN_x$ (silicon nitride), or the like as one kind of inorganic insulating material (inorganic resin material). The flattening film 23 is made of PMMA (acrylic resin) or the like as one kind of organic insulating material (organic material). The gate insulating film 19 is interposed between the first metal film 18 and the semiconductor film 20 and insulates them. In particular, a part of the gate insulating film 19, which is interposed between the gate line 13 formed of the first metal film 18 and the source line 14 formed of the second metal film 21 that cross with each other, insulates both the lines 13 and 14. The inter-layer insulating film 22 and the flattening film 23 are interposed between the transparent electrode film 24 and a set of the semiconductor film 20 and the second metal film 21 to insulate them. The flattening film 23 among them has a film thickness greater than those of the other insulating films 19 and 22 made of an inorganic resin material and functions to flatten a surface of the array substrate 10A. At a position where the inter-layer insulating film 22 and the flattening film 23 are overlapped with a portion where the drain electrode 11C of the TFT 11 and the pixel electrode 12 are overlapped, a contact hole CH is formed so as to be opened. Thus, the pixel connection portion 11C1 of the drain electrode 11C and a part of the pixel electrode 12 that are overlapped with each other are connected through the contact hole CH.

Figure 6:
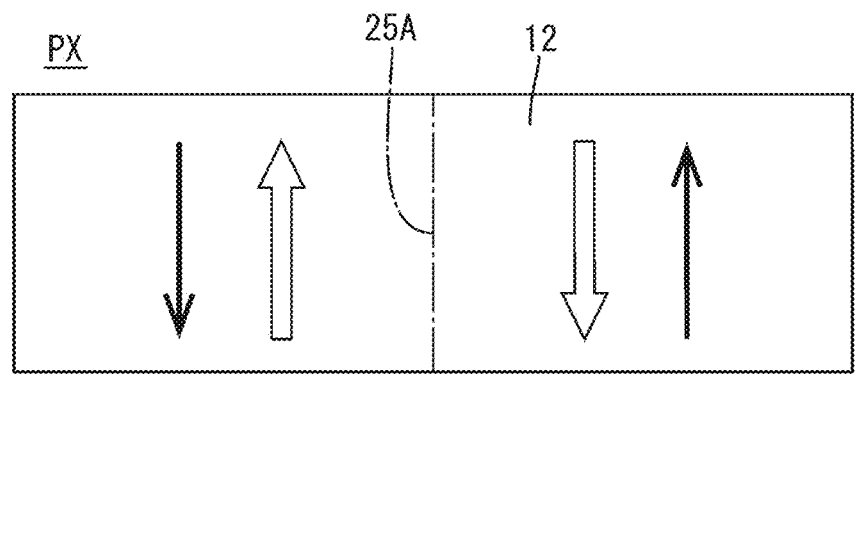
FIG. 6 is a view for explaining an alignment process in an alignment film of an array substrate.
Figure 7:
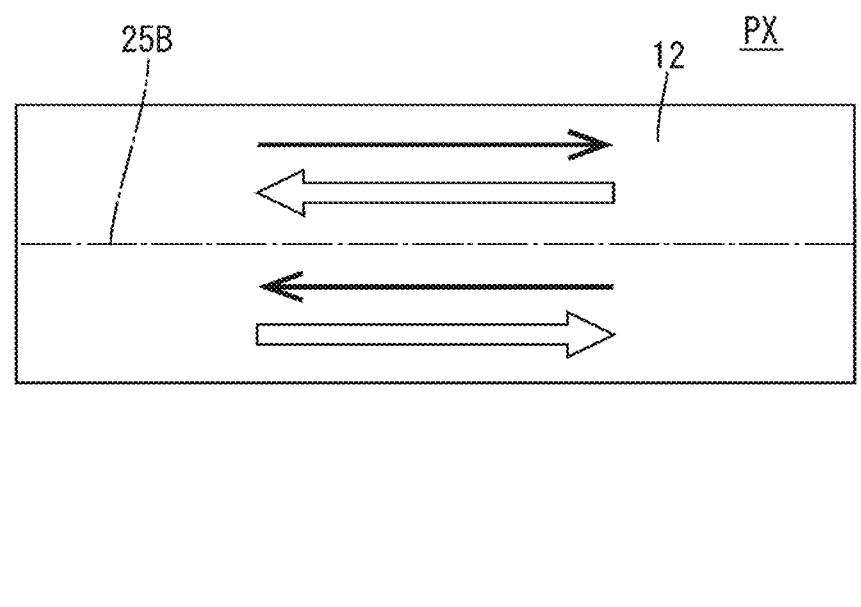
FIG. 7 is a view for explaining an alignment process in an alignment film of a CF substrate constituting the liquid crystal panel.
Figure 8:
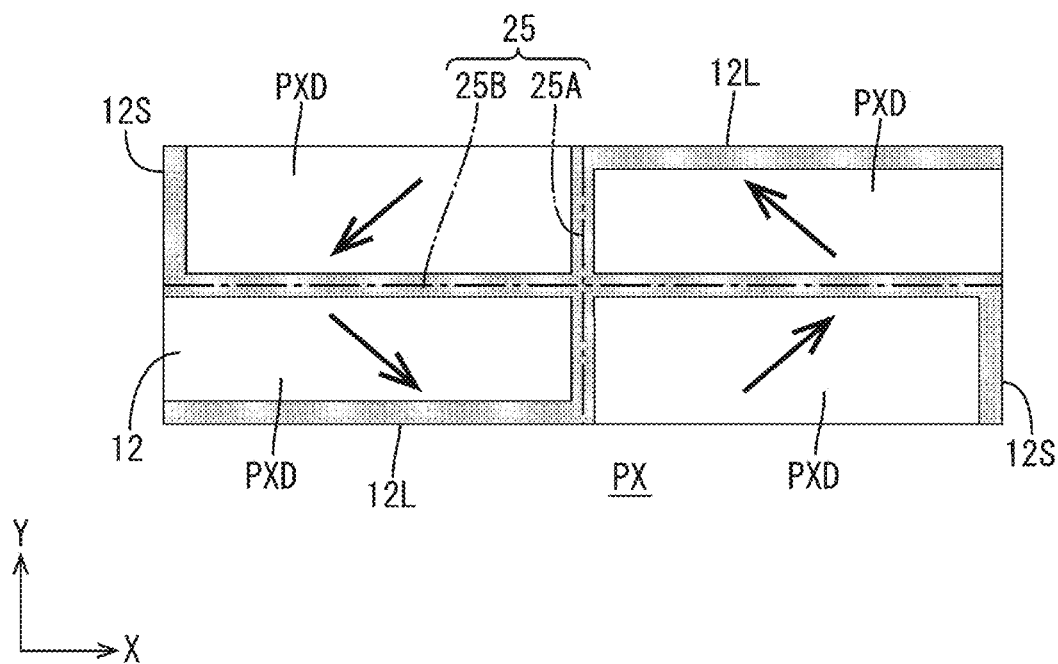
FIG. 8 is a view for explaining, for example, a tilt direction of liquid crystal molecules in one pixel portion of the liquid crystal panel.

Here, the alignment films 10E will be described in detail with reference to FIGS. 6 to 8. FIG. 6 is a view for explaining an alignment process in the alignment film 10E of the array substrate 10A and illustrates the array substrate 10A as viewed from a side of the liquid crystal layer 10C. FIG. 7 is a view for explaining an alignment process in the alignment film 10E of the CF substrate 10B and illustrates the CF substrate 10B as viewed from a side opposite to the liquid crystal layer 10C, that is, a side where a polarizer is attached. FIG. 8 is a view for explaining, for example, a tilt direction (alignment direction) of liquid crystal molecules in one pixel portion PX of the liquid crystal panel 10 and is a view as viewed from a side of the CF substrate 10B with the array substrate 10A on a lower side and the CF substrate 10B on an upper side. Each of the alignment films 10E provided in the innermost surfaces of the substrates 10A and 10B is a vertical alignment film that causes long axes of the liquid crystal molecules included in the liquid crystal layer 10C to be aligned substantially vertical to a film surface of the substrate in a state where no voltage is applied to the liquid crystal layer 10C. That is, the liquid crystal panel 10 according to the present embodiment has a VA (Vertical Alignment) mode as a display mode, more specifically, a 4D-RTN (4-Domain Reverse Twisted Nematic) mode in which alignment of liquid crystal molecules is different in each of four domains PXD obtained by dividing the pixel portion PX, for example. Specifically, the alignment films 10E are photo alignment films surfaces of which are subjected to a photo alignment process to allow application of alignment restriction force to the liquid crystal molecules, and an appropriate photo alignment process is performed for a plurality of domains PXD described above. That is, for the alignment film 10E on the array substrate 10A side, as illustrated in FIG. 6, respective two regions arranged along the X-axis direction with a center position of each of the pixel portions PX in the X-axis direction as a boundary are irradiated with alignment process light rays (polarizing ultraviolet rays), directions of which are opposite to each other, along the Y-axis direction during a manufacturing process. In FIG. 6, an irradiation direction of an alignment process light ray is illustrated by an outlined white arrow and a tilt direction (alignment direction, direction in which the liquid crystal molecules fall when a voltage is applied to the liquid crystal layer) of the liquid crystal molecules is illustrated by an arrow of a solid line. In the present embodiment, a left-side region illustrated in FIG. 6 is irradiated with an upward alignment process light ray of the figure and a right-side region illustrated in FIG. 6 is irradiated with a downward alignment process light ray of the figure. Note that, when the alignment process light rays whose directions are opposite to each other are radiated, a mask is used to avoid radiation of the alignment process light rays to an unnecessary portion. On the other hand, for the alignment film 10E on the CF substrate 10B side, as illustrated in FIG. 7, respective two regions arranged along the Y-axis direction with a center position of each of the pixel portions PX in the Y-axis direction as a boundary are irradiated with alignment process light rays, directions of which are opposite to each other, along the X-axis direction during a manufacturing process. In FIG. 7, an irradiation direction of an alignment process light ray is illustrated by an outlined white arrow and a tilt direction of the liquid crystal molecules is illustrated by an arrow of a solid line. In the present embodiment, an upper-side region illustrated in FIG. 7 is irradiated with a leftward alignment process light ray of the figure and a lower-side region illustrated in FIG. 7 is irradiated with a rightward alignment process light ray of the figure.

By the pair of alignment films 10E subjected to such a light alignment process, the pixel portion PX is divided into four domains PXD whose tilt directions of the liquid crystal molecules are different from each other, as illustrated in FIG. 8. In FIG. 8, the tilt directions of the liquid crystal molecules near a middle of the liquid crystal layer 10C in a thickness direction are illustrated by arrows of solid lines. The four domains PXD are arranged in a matrix form in which two domains are arranged in the X-axis direction and two domains are arranged in the Y-axis direction. At a boundary position of the four domains PXD, alignment of the liquid crystal molecules is different from all the four domains PXD and the boundary position serves as an alignment boundary portion 25. Each of the alignment films 10E has the alignment boundary portion 25 of a substantially cross shape in plan view. The alignment boundary portion 25 is configured by including a first alignment boundary portion 25A that extends along the Y-axis direction and a second alignment boundary portion 25B that extends along the X-axis direction. Note that, in FIGS. 2 and 8, the alignment boundary portion 25 of the four domains PXD is illustrated by a one dot chain line. The alignment boundary portion 25 tends to be easily a dark portion where a light quantity is locally small, because the alignment state of the liquid crystal molecules is difficult to be appropriately controlled. Note that, in FIG. 8, a region where the dark portion is generated is illustrated with shading. In the present embodiment, the tilt directions of the liquid crystal molecules in the four domains PXD are set so as to be different from each other by an integral multiple of 90 degrees. That is, the tilt direction of the liquid crystal molecules is an upper-left diagonal direction in an upper-right domain PXD illustrated in FIG. 8, the tilt direction of the liquid crystal molecules is a lower-left diagonal direction in an upper-left domain PXD illustrated in FIG. 8, the tilt direction of the liquid crystal molecules is a lower-right diagonal direction in a lower-left domain PXD illustrated in FIG. 8, and the tilt direction of the liquid crystal molecules is an upper-right diagonal direction in a lower-right domain PXD illustrated in FIG. 8. In this manner, the liquid crystal molecules arranged in the respective domains PXD are restricted to be aligned in different directions by the pair of alignment films 10E, so that an even viewing angle characteristic of an image displayed in the liquid crystal panel 10 is achieved and excellent display performance is thus obtained.

Here, the array substrate 10A constituting the liquid crystal panel 10 according to the present embodiment is provided with a capacitor line 26 that is overlapped with the pixel electrode 12 with the inter-layer insulating film 22 and the flattening film 23 (insulating film) in between as illustrated in FIGS. 2 and 4. The capacitor line 26 is kept at a reference potential (for example, which may be the same potential as that of the facing electrode 17 or a potential keeping a specific potential difference from that of the facing electrode 17) and forms electrostatic capacitance with the pixel electrode 12 to be overlapped, so that when the pixel electrode 12 is charged, the potential is kept. The capacitor line 26 extends along the Y-axis direction, that is, the transverse direction of the pixel electrode 12, and, in other words, extends in parallel to the source line 14. The capacitor line 26 crosses all of a plurality of pixel electrodes 12, which are arranged along the Y-axis direction and form one line, and is arranged so as to be overlapped with the pixel electrodes 12 at once. A plurality of capacitor lines 26 are arranged in line with an interval of about a longitudinal dimension of a pixel electrode 12 in the longitudinal direction. The arrangement interval of the capacitor lines 26 is almost equal to an arrangement interval of the source lines 14 and an arrangement interval of the pixel electrodes 12 in the X-axis direction. The installation number of capacitor lines 26 coincides with the number of pixel electrodes 12 arranged in the X-axis direction and the installation number of source lines 14.

Meanwhile, in the array substrate 10A constituting the liquid crystal panel 10 according to the present embodiment, as described above, the gate line 13 is provided so as to extend along the longitudinal direction (X-axis direction) of the pixel electrode 12 and the source line 14 is provided so as to extend along the transverse direction (Y-axis direction) of the pixel electrode 12, as illustrated in FIG. 2. Thereby, reduction in the installation number of source lines 14 is achieved, whereas the installation number of gate lines 13 increases. Thus, the number of places where the source line 14 crosses the gate line 13 tends to increase and it is concerned that signal delay is caused due to parasitic capacitance generated between the source line 14 and the gate line 13. On the other hand, the capacitor line 26 extends along the transverse direction of the pixel electrode 12, and is thus configured so as not to cross the source line 14 but to cross the gate line 13. This makes it possible to avoid generation of parasitic capacitance between the source line 14 and the capacitor line 26. Thus, as compared to a configuration in which it is assumed that the capacitor line extends along the longitudinal direction of the pixel electrode 12 and parasitic capacitance is generated between the source line 14 and the capacitor line, signal delay that can be caused in the source line 14 is reduced.

The capacitor line 26 is arranged so as to be overlapped with at least a part of the alignment boundary portion 25 as illustrated in FIGS. 2 and 4. Specifically, the capacitor line 26 is arranged at an almost center position of the pixel electrode 12 in the X-axis direction and arranged so as to be overlapped with an entire region of the first alignment boundary portion 25A extending along the Y-axis direction in the alignment boundary portion 25. As described above, the alignment boundary portion 25 tends to be easily the dark portion where the light quantity is locally small, because the alignment state of the liquid crystal molecules is difficult to be appropriately controlled. In particular, a position and a width of the dark portion caused by the alignment boundary portion 25 may vary due to alignment accuracy of the mask used when the surface of the alignment film 10E formed on the array substrate 10A is subjected to a photo alignment process, and when the display region has a part where the width of the dark portion is different, display unevenness tends to be visually recognized easily. When the capacitor line 26 is arranged so as to be overlapped with the first alignment boundary portion 25A of the alignment boundary portion 25 as described above, the capacitor line 26 makes it difficult to visually recognize the display unevenness caused by the first alignment boundary portion 25A and luminance reduction caused when the capacitor line 26 is arranged so as to be overlapped with the pixel electrode 12 is suppressed. Additionally, the capacitor line 26 is formed of the second metal film 21 which is the same as that of the source line 14. This makes it possible to achieve reduction of manufacturing cost, as compared to a configuration in which the both lines are assumed to be formed of different metal films. Both the source line 14 and the capacitor line 26 have a relationship to extend along the Y-axis direction and cross the gate line 13, but are formed of the second metal film 21 that has the gate insulating film 19 interposed between the second metal film 21 and the gate line 13, so that short-circuit with respect to the gate line 13 is avoided.

In the array substrate 10A constituting the liquid crystal panel 10 according to the present embodiment, a light shielding portion 27 that extends along the longitudinal direction of the pixel electrode 12 and is arranged so as to be overlapped with the second alignment boundary portion 25B of the alignment boundary portion 25 as illustrated in FIGS. 2 and 5 is provided. The light shielding portion 27 is arranged at an almost center position of the pixel electrode 12 in the Y-axis direction and is arranged so as to be overlapped with a large part of the second alignment boundary portion 25B which extends along the X-axis direction in the alignment boundary portion 25, other than both ends of the second alignment boundary portion 25B. Similarly to the first alignment boundary portion 25A, in the second alignment boundary portion 25B, a position and a width of a dark portion that is generated vary due to alignment accuracy of the mask used when the surface of the alignment film 10E formed on the CF substrate 10B is subjected to a photo alignment process, and display unevenness is visually recognized easily. Additionally, since the second alignment boundary portion 25B exists in a wider range than the first alignment boundary portion 25A exists, display unevenness tends to be visually recognized more easily. When the light shielding portion 27 is arranged so as to be overlapped with such a second alignment boundary portion 25B, the light shielding portion 27 makes it difficult to visually recognize the display unevenness caused by the second alignment boundary portion 25B and luminance reduction caused when the light shielding portion 27 is arranged so as to be overlapped with the pixel electrode 12 is suppressed. Additionally, the light shielding portion 27 is formed of the second metal film 21, which is the same as that of the capacitor line 26, and continued to the capacitor line 26. Since the light shielding portion 27 is arranged so as to be overlapped with the pixel electrode 12 with the inter-layer insulating film 22 and the flattening film 23 in between, electrostatic capacitance is formed between the light shielding portion 27 and the pixel electrode 12. Since the light shielding portion 27 is electrically connected to the capacitor line 26, electrostatic capacitance formed between the pixel electrode 12 and the capacitor line 26 increases so that a more favorable potential of the pixel electrode 12 is able to be kept. Moreover, as compared to a case where it is assumed that the light shielding portion is formed of another metal film (conductor film), in which an insulating film is interposed between the metal film and the capacitor line 26, and the light shielding portion and the capacitor line 26 are connected by a contact hole that is formed so as to be opened in the insulating film, generation of the dark portion caused by such a contact hole is avoided.

In the second alignment boundary portion 25B, as illustrated in FIG. 2, the pixel connection portion 11C1 in the drain electrode 11C of the TFT 11 and the contact hole CH are arranged so as to be overlapped with each other. The pixel connection portion 11C1 and the contact hole CH are arranged at the almost center position of the pixel electrode 12 in the Y-axis direction and arranged as to be aligned on the same straight line with the light shielding portion 27 described above. The pixel connection portion 11C1 and the contact hole CH are arranged so as to be overlapped with one (left-side illustrated in FIG. 2) end of the pixel electrode 12 in the X-axis direction but so as not to be overlapped with the light shielding portion 27. Here, around the contact hole CH by which the pixel connection portion 11C1 of the drain electrode 11C and a part of the pixel electrode 12 are connected, alignment of the liquid crystal molecules included in the liquid crystal layer 10C is easily disturbed so that a degree of contribution to display tends to be originally low. On the other hand, since the pixel connection portion 11C1 of the drain electrode 11C is arranged so as to be overlapped with the second alignment boundary portion 25B, as compared to a case where the pixel connection portion is assumed to be arranged so as not to be overlapped with the second alignment boundary portion 25B, a wide range effectively used for display in the pixel electrode 12 is ensured. Thereby, excellent display quality is kept.

Here, a relationship between an outer periphery of the pixel electrode 12 and a tilt direction of liquid crystal molecules near the middle of the liquid crystal layer 10C in the thickness direction will be described in detail with reference to FIG. 8. As illustrated in FIG. 8, the outer periphery of the pixel electrode 12 forms respective two outer sides of four domains PXD of the pixel portion PX other than respective two sides thereof facing the alignment boundary portion 25. On the other hand, tilt directions of the liquid crystal molecules included in the liquid crystal layer 10C are different from each other by an integral multiple of 90 degrees in the respective domains PXD as described above. Thus, in the upper-right domain PXD illustrated in FIG. 8, an azimuthal direction that is perpendicular to a short-side edge 12S of the pixel electrode 12 and points toward an inside of the pixel electrode 12 defines an acute angle (angle not exceeding 90 degrees) with respect to the tilt direction of the liquid crystal molecules, whereas an azimuthal direction that is perpendicular to a long-side edge 12L of the pixel electrode 12 and points toward the inside of the pixel electrode 12 defines an obtuse angle (angle exceeding 90 degrees) with respect to the tilt direction of the liquid crystal molecules. Similarly, in the upper-left domain PXD illustrated in FIG. 8, an azimuthal direction that is perpendicular to the short-side edge 12S of the pixel electrode 12 and points toward the inside of the pixel electrode 12 defines an obtuse angle with respect to the tilt direction of the liquid crystal molecules, whereas an azimuthal direction that is perpendicular to the long-side edge 12L of the pixel electrode 12 and points toward the inside of the pixel electrode 12 defines an acute angle with respect to the tilt direction of the liquid crystal molecules. Similarly, in the lower-left domain PXD illustrated in FIG. 8, an azimuthal direction that is perpendicular to the short-side edge 12S of the pixel electrode 12 and points toward the inside of the pixel electrode 12 defines an acute angle with respect to the tilt direction of the liquid crystal molecules, whereas an azimuthal direction that is perpendicular to the long-side edge 12L of the pixel electrode 12 and points toward the inside of the pixel electrode 12 defines an obtuse angle with respect to the tilt direction of the liquid crystal molecules. In the lower-right domain PXD illustrated in FIG. 8, an azimuthal direction that is perpendicular to the short-side edge 12S of the pixel electrode 12 and points toward the inside of the pixel electrode 12 defines an obtuse angle with respect to the tilt direction of the liquid crystal molecules, whereas an azimuthal direction that is perpendicular to the long-side edge 12L of the pixel electrode 12 and points toward the inside of the pixel electrode 12 defines an acute angle with respect to the tilt direction of the liquid crystal molecules. Meanwhile, near the outer periphery of the pixel electrode 12, an electric field generated between the gate line 13 or the source line 14 and the pixel electrode 12 exists, and the electric field can apply alignment restriction force to the liquid crystal molecules included in the liquid crystal layer 10C. An electric field generated near an edge which is included in the outer periphery of the pixel electrode 12 and in which an azimuthal direction that is perpendicular to the edge and points toward the inside of the pixel electrode 12 defines an obtuse angle with respect to the tilt direction of the liquid crystal molecules applies alignment restriction force in a direction opposite to the tilt direction described above to the liquid crystal molecules, so that alignment of the liquid crystal molecules is easily disturbed near the edge and a dark portion may be visually recognized. In particular, the dark portion caused by the disturbed alignment of the liquid crystal molecules described above can slightly vary in width in accordance with intensity of the electric field generated near the edge which is included in the outer periphery of the pixel electrode 12 and in which the azimuthal direction that is perpendicular to the edge and points toward the inside of the pixel electrode 12 defines the obtuse angle with respect to the tilt direction of the liquid crystal molecules. The intensity of the electric field described above varies in accordance with a distance between the edge of the pixel electrode 12 and a side edge of the gate line 13 or the source line 14, a film thickness of the inter-layer insulating film 22 or the flattening film 23, or the like. Thus, when the display region has a part where the width of the dark portion is different, display unevenness tends to be visually recognized easily.

Thus, as illustrated in FIGS. 2 and 5, the array substrate 10A constituting the liquid crystal panel 10 according to the present embodiment is provided with an edge light shielding portion 28 that is arranged so as to be overlapped with at least a part of an edge which is included in the outer periphery of the pixel electrode 12 and in which an azimuthal direction that is perpendicular to the edge and points toward the inside of the pixel electrode 12 defines an obtuse angle with respect to the tilt direction of the liquid crystal molecules near the middle of the liquid crystal layer 10C in the thickness direction when a voltage is applied to the liquid crystal layer 10C. The edge light shielding portion 28 is arranged so as to be overlapped with at least a part of the long-side edge 12L which is included in the outer periphery of the pixel electrode 12 and in which an azimuthal direction that is perpendicular to the edge and points toward the inside of the pixel electrode 12 defines an obtuse angle with respect to the tilt direction. Specifically, two edge light shielding portions 28 are arranged so as to be overlapped with the long-side edge 12L of the pixel electrode 12 in the upper-right domain PXD illustrated in FIG. 2 and the long-side edge 12L of the pixel electrode 12 in the lower-left domain PXD illustrated in FIG. 2. Each of the edge light shielding portions 28 extends along the X-axis direction and is overlapped with an almost entire region of each of long-side edges 12L of the pixel electrode 12 described above. According to such a configuration, even in a case where alignment of the liquid crystal molecules is disturbed due to alignment restriction force applied to the liquid crystal molecules by the electric field generated between the gate line 13 and the long-side edge 12L which is included in the outer periphery of the pixel electrode 12 and in which the azimuthal direction that is perpendicular to the edge and points toward the inside of the pixel electrode 12 defines the obtuse angle with respect to the tilt direction of the liquid crystal molecules, the edge light shielding portion 28 arranged so as to be overlapped with the long-side edge 12L in which the azimuthal direction described above defines the obtuse angle with respect to the tilt direction of the liquid crystal molecules described above makes it difficult to visually recognize the dark portion caused by the disturbed alignment. As a result, even when the display region has a part where the width of the dark portion is different, display unevenness is less likely to be visually recognized and excellent display quality is kept. Additionally, the long-side edge 12L in which the azimuthal direction described above defines the obtuse angle with respect to the tilt direction of the liquid crystal molecules described above is formed in a wider range as compared to the short-side edge 12S and tends to also have a wider range where the dark portion is generated, but when the edge light shielding portion 28 is arranged so as to be overlapped with the long-side edge 12L, the dark portion that can be generated over a wide range near the long-side edge 12L is less likely to be visually recognized. Thereby, excellent display quality is kept. Note that, the edge light shielding portion 28 is not arranged so as to be overlapped with each of short-side edges 12S in the upper-left domain PXD and the lower-right domain PXD illustrated in FIG. 2, but the short-side edge 12S has a relatively narrower range where the dark portion can be generated than the long-side edge 12L, so that display quality is not considerably deteriorated. Moreover, also in a case where display quality is improved by hiding the dark portion with the black matrix 16, each of short-side edges 12S has a relatively narrower range where the dark portion can be generated than the long-side edge 12L, so that an influence on reduction of luminance is small.

As illustrated in FIGS. 2 and 5, the edge light shielding portion 28 is formed of the second metal film 21, which is the same as that of the capacitor line 26, and is continued to the capacitor line 26. Since the edge light shielding portion 28 is arranged so as to be overlapped with the long-side edge 12L of the pixel electrode 12 with the inter-layer insulating film 22 and the flattening film 23 in between, electrostatic capacitance is formed between the edge light shielding portion 28 and the pixel electrode 12. The edge light shielding portion 28 is electrically connected to the capacitor line 26 and is thus able to shield the electric field generated near the long-side edge 12L which is included in the outer periphery of the pixel electrode 12 and in which the azimuthal direction that is perpendicular to the edge and points toward the inside of the pixel electrode 12 defines the obtuse angle with respect to the tilt direction described above. Thereby, disturbed alignment of the liquid crystal molecules is difficult to be generated near the long-side edge 12L in which the azimuthal direction described above defines the obtuse angle with respect to the tilt direction described above, so that the dark portion is less likely to be visually recognized, which contributes to improvement of display quality. Additionally, when the edge light shielding portion 28 is electrically connected to the capacitor line 26, the electrostatic capacitance formed between the pixel electrode 12 and the capacitor line 26 increases, so that a more favorable potential of the pixel electrode 12 is able to be kept. Moreover, as compared to a case where it is assumed that the edge light shielding portion is formed of another metal film (conductor film) in which an insulating film is interposed between the metal film and the capacitor line 26 and the edge light shielding portion and the capacitor line 26 are connected by a contact hole that is formed so as to be opened in the insulating film, generation of the dark portion caused by such a contact hole is avoided.

As illustrated in FIGS. 2 and 5, the edge light shielding portion 28 is arranged so as not to be overlapped with the gate line 13 but to be adjacent to a side edge 13E of the gate line 13. Thereby, an electric field that can be generated between the side edge 13E of the gate line 13 and the long-side edge 12L of the pixel electrode 12 is able to be shielded by the edge light shielding portion 28 that is arranged so as to be adjacent to the side edge 13E of the gate line 13. Accordingly, disturbed alignment of the liquid crystal molecules is more difficult to be generated near the long-side edge 12L in which the azimuthal direction described above defines the obtuse angle with respect to the tilt direction described above, so that the dark portion is much less likely to be visually recognized, which contributes to improvement of display quality. Further, since the edge light shielding portion 28 is arranged so as not to be overlapped with the gate line 13, parasitic capacitance that can be generated between the gate line 13 and the capacitor line 26 is suppressed.

As described above, the liquid crystal panel (display apparatus) 10 of the present embodiment includes the pixel electrode 12 that has a longitudinal shape, the TFT (switching element) 11 that is connected to the pixel electrode 12, the gate line (scanning line) 13 that extends along the longitudinal direction of the pixel electrode 12 and is connected to the TFT 11 to transfer a signal by which the TFT 11 is driven, the source line (image line) 14 that extends along the transverse direction of the pixel electrode 12 and is connected to the TFT 11 to transfer a signal by which the pixel electrode 12 is charged, the liquid crystal layer 10C that includes the liquid crystal molecules, a plurality of domains PXD that are different in alignment direction of the liquid crystal molecules when a voltage is applied to the liquid crystal layer 10C, the alignment boundary portion 25 that is positioned in a boundary of the plurality of domains PXD, the alignment film 10E that aligns the liquid crystal molecules, and the capacitor line 26 that extends along the transverse direction and is arranged so as to be overlapped with the pixel electrode 12 with the inter-layer insulating film 22 and the flattening film 23 (insulating film) in between and overlapped with at least a part of the alignment boundary portion 25.

As a result, when the TFT 11 is driven on the basis of the signal transferred to the gate line 13, the signal transferred to the source line 14 is supplied to the pixel electrode 12 through the TFT 11 and the pixel electrode 12 is thereby charged. The charged pixel electrode 12 forms electrostatic capacitance with the capacitor line 26 that is overlapped with the pixel electrode 12 with the inter-layer insulating film 22 and the flattening film 23 in between, so that a potential of the pixel electrode 12 is kept. Here, in a case where a plurality of gate lines 13 and a plurality of source lines 14 are installed, an arrangement interval of the source lines 14 extending along the transverse direction of the pixel electrode 12 is greater than an arrangement interval of the gate lines 13 extending along the longitudinal direction of the pixel electrode 12. Thus, as compared to a case where extension directions of the gate lines and the source lines are assumed to be in a reverse relationship, the installation number of source lines 14 may be small, which is suitable for achieving improvement of definition. On the other hand, since the installation number of gate lines 13 increases, the number of places where the source line 14 crosses the gate line 13 tends to increase and it is concerned that signal delay is caused due to parasitic capacitance generated between the source line 14 and the gate line 13. Meanwhile, the capacitor line 26 extends along the transverse direction of the pixel electrode 12, and is thus configured so as not to cross the source line 14 but to cross the gate line 13. This makes it possible to avoid generation of parasitic capacitance between the source line 14 and the capacitor line 26. Thus, as compared to a configuration in which it is assumed that the capacitor line extends along the longitudinal direction of the pixel electrode 12 and parasitic capacitance is generated between the source line 14 and the capacitor line, signal delay that can be caused in the source line 14 is reduced. Additionally, the capacitor line 26 is arranged so as to be overlapped with at least a part of the alignment boundary portion 25 positioned in the boundary of the plurality of domains PXD that are different in alignment direction of the liquid crystal molecules included in the liquid crystal layer 10C. The alignment boundary portion 25 tends to be easily a dark portion where a light quantity is locally small, because the alignment state of the liquid crystal molecules is difficult to be appropriately controlled. When the capacitor line 26 is arranged so as to be overlapped with at least a part of the alignment boundary portion 25 as described above, the capacitor line 26 makes it difficult to visually recognize display unevenness caused by a variation of a width or the like of the dark portion in the display region and luminance reduction caused when the capacitor line 26 is arranged so as to be overlapped with the pixel electrode 12 is suppressed.

Moreover, the alignment film 10E may be subjected to a plurality of alignment processes to differentiate alignment directions of the liquid crystal molecules, and a boundary of portions subjected to the plurality of alignment processes may correspond to the alignment boundary portion 25. When the alignment film 10E is subjected to an alignment process, the liquid crystal molecules are aligned in a specific direction by a portion subjected to the alignment process. The alignment film 10E is subjected to a plurality of alignment processes so that the alignment directions of the liquid crystal molecules are differentiated, and there is a corresponding relationship between a boundary of portions subjected to the plurality of alignment processes and a boundary of a plurality of domains PXD.

Moreover, the alignment boundary portion 25 may be configured by including the first alignment boundary portion 25A that extends along the transverse direction and is overlapped with the capacitor line 26 and the second alignment boundary portion 25B that extends along the longitudinal direction, and the light shielding portion 27 that extends along the longitudinal direction and is arranged so as to be overlapped with the second alignment boundary portion 25B may be included. As a result, division into four domains PXD that are different in alignment direction of the liquid crystal molecules is achieved by the first alignment boundary portion 25A that extends along the transverse direction of the pixel electrode 12 and the second alignment boundary portion 25B that extends along the longitudinal direction, which is suitable for improvement of a viewing angle characteristic. When the capacitor line 26 is arranged so as to be overlapped with the first alignment boundary portion 25A of the alignment boundary portion 25, the dark portion caused by the first alignment boundary portion 25A is difficult to be visually recognized. On the other hand, when the light shielding portion 27 is arranged so as to be overlapped with the second alignment boundary portion 25B, the dark portion caused by the second alignment boundary portion 25B whose range is wider than that of the first alignment boundary portion 25A is difficult to be visually recognized. Accordingly, the dark portion caused by the alignment boundary portion 25 is much less likely to be visually recognized and display unevenness caused by a variation of a width or the like of the dark portion in the display region is less likely to be visually recognized.

Moreover, the light shielding portion 27 may be electrically connected to the capacitor line 26. As a result, since the light shielding portion 27 is electrically connected to the capacitor line 26, the electrostatic capacitance formed between the pixel electrode 12 and the capacitor line 26 increases so that a more favorable potential of the pixel electrode 12 is able to be kept.

Moreover, the light shielding portion 27 may be formed of the second metal film (conductor film) 21, which is the same as that of the capacitor line 26, and may be continued to the capacitor line 26. As a result, as compared to a case where it is assumed that the light shielding portion is formed of another metal film (conductor film) in which an insulating film is interposed between the metal film and the capacitor line 26 and the light shielding portion and the capacitor line 26 are connected by a contact hole that is formed so as to be opened in the insulating film, generation of the dark portion caused by such a contact hole is avoided.

Moreover, the TFT 11 may include the gate electrode 11A connected to the gate line 13, the source electrode 11B connected to the source line 14, the drain electrode 11C connected to the pixel electrode 12, and the channel portion 11D connected to the source electrode 11B and the drain electrode 11C, and the drain electrode 11C may have the pixel connection portion 11C1 that is overlapped with the second alignment boundary portion 25B and overlapped with a part of the pixel electrode 12 with the inter-layer insulating film 22 and the flattening film 23 in between, and is connected to the pixel electrode 12 through the contact hole CH formed so as to be opened in the inter-layer insulating film 22 and the flattening film 23. As a result, when a signal transferred to the gate line 13 is supplied to the gate electrode 11A, the TFT 11 is driven. Then, a signal transferred to the source line 14 is supplied to the source electrode 11B and supplied from the source electrode 11B to the drain electrode 11C through the channel portion 11D. Since the drain electrode 11C has the pixel connection portion 11C1 connected to the pixel electrode 12 through the contact hole CH formed so as to be opened in the inter-layer insulating film 22 and the flattening film 23 that are interposed between the pixel connection portion 11C1 and the pixel electrode 12, the pixel electrode 12 is charged to a potential according to the signal transferred to the source line 14. Here, around the contact hole CH by which the drain electrode 11C and a part of the pixel electrode 12 are connected, alignment of the liquid crystal molecules included in the liquid crystal layer 10C is easily disturbed so that a degree of contribution to display tends to be originally low. On the other hand, since the pixel connection portion 11C1 of the drain electrode 11C is arranged so as to be overlapped with the second alignment boundary portion 25B, as compared to a case where the pixel connection portion is assumed to be arranged so as not to be overlapped with the second alignment boundary portion 25B, a wide range effectively used for display in the pixel electrode 12 is ensured. Thereby, excellent display quality is kept.

Moreover, the edge light shielding portion 28 that is arranged so as to be overlapped with at least a part of an edge which is included in the outer periphery of the pixel electrode 12 and in which an azimuthal direction that is perpendicular to the edge and points toward the inside of the pixel electrode defines an obtuse angle with respect to the tilt direction of the liquid crystal molecules near the middle of the liquid crystal layer 10C in the thickness direction when a voltage is applied to the liquid crystal layer 10C may be included. Near the outer periphery of the pixel electrode 12, an electric field generated between the pixel electrode 12 and another conductor (gate line 13 or source line 14) exists, and the electric field can apply alignment restriction force to the liquid crystal molecules included in the liquid crystal layer 10C. The outer periphery of the pixel electrode 12 includes the following edge. That is, the edge is an edge in which an azimuthal direction that is perpendicular to the edge and points toward the inside of the pixel electrode 12 defines an obtuse angle with respect to the tilt direction of the liquid crystal molecules near the middle of the liquid crystal layer 10C in the thickness direction when a voltage is applied to the liquid crystal layer 10C. The electric field generated near the edge applies alignment restriction force in a direction opposite to the tilt direction described above to the liquid crystal molecules, so that alignment of the liquid crystal molecules is easily disturbed near the edge. On the other hand, since the edge light shielding portion 28 is arranged so as to be overlapped with at least a part of the edge which is included in the outer periphery of the pixel electrode 12 and in which the azimuthal direction described above defines the obtuse angle with respect to the tilt direction described above, even when alignment of the liquid crystal molecules is disturbed when the alignment restriction force is applied by the electric field described above, display failure caused by the disturbed alignment of the liquid crystal molecules is less likely to be visually recognized. Thereby, excellent display quality is kept.

Moreover, the edge light shielding portion 28 may be arranged so as to be overlapped with at least a part of the long-side edge 12L which is included in the outer periphery of the pixel electrode 12 and in which an azimuthal direction that is perpendicular to the edge and points toward the inside of the pixel electrode defines an obtuse angle with respect to the tilt direction. The long-side edge 12L of the outer periphery of the pixel electrode 12 is formed in a wider range as compared to the short-side edge 12S. When the edge light shielding portion 28 is arranged so as to be overlapped with at least a part of the long-side edge 12L in which the azimuthal direction described above defines the obtuse angle with respect to the tilt direction described above, display failure that can be generated over a wide range near the long-side edge 12L is less likely to be visually recognized. Thereby, excellent display quality is kept.

Moreover, the edge light shielding portion 28 may be electrically connected to the capacitor line 26. As a result, an electric field generated near at least a part of the edge which is included in the outer periphery of the pixel electrode 12 and in which the azimuthal direction described above defines the obtuse angle with respect to the tilt direction described above is shielded by the edge light shielding portion 28 electrically connected to the capacitor line 26. Thereby, disturbed alignment of the liquid crystal molecules is difficult to be generated near the edge in which the azimuthal direction described above defines the obtuse angle with respect to the tilt direction described above, so that display failure is less likely to be visually recognized, which contributes to improvement of display quality. Additionally, when the edge light shielding portion 28 that is overlapped with the edge of the pixel electrode 12 is electrically connected to the capacitor line 26, the electrostatic capacitance formed between the pixel electrode 12 and the capacitor line 26 increases, so that a more favorable potential of the pixel electrode 12 is able to be kept.

Moreover, the gate line 13 may be arranged so as not to be overlapped with the pixel electrode 12, and the edge light shielding portion 28 may be arranged so as not to be overlapped with the gate line 13 but to be adjacent to the side edge 13E of the gate line 13. As a result, when the gate line 13 is arranged so as not to be overlapped with the pixel electrode 12, parasitic capacitance that can be generated between the gate line 13 and the pixel electrode 12 is suppressed. An electric field that can be generated between the side edge 13E of the gate line 13 and the long-side edge 12L of the pixel electrode 12 is shielded by the edge light shielding portion 28 that is arranged so as to be adjacent to the side edge 13E of the gate line 13. Accordingly, disturbed alignment of the liquid crystal molecules is more difficult to be generated near the edge in which the azimuthal direction described above defines the obtuse angle with respect to the tilt direction described above, so that display failure is much less likely to be visually recognized, which contributes to improvement of display quality. Further, since the edge light shielding portion 28 is arranged so as not to be overlapped with the gate line 13, parasitic capacitance that can be generated between the gate line 13 and the capacitor line 26 is suppressed.

Moreover, the edge light shielding portion 28 may be formed of the second metal film (conductor film) 21, which is the same as that of the capacitor line 26, and may be continued to the capacitor line 26. As a result, as compared to a case where it is assumed that the edge light shielding portion is formed of another metal film (conductor film) in which an insulating film is interposed between the metal film and the capacitor line 26 and the edge light shielding portion and the capacitor line 26 are connected by a contact hole that is formed so as to be opened in the insulating film, generation of the dark portion caused by such a contact hole is avoided.

Moreover, the capacitor line 26 may be formed of the second metal film (conductor film) 21 which is the same as that of the source line 14. The source line 14 and the capacitor line 26 extend along the transverse direction of the pixel electrode 12 and have a relationship to cross the gate line 13, and are thus desired to be formed of the second metal film 21 in which the gate insulating film (insulating film) 19 is interposed between the second metal film 21 and the gate line 13 in order to avoid short-circuit. Here, in a case where the source line and the capacitor line are assumed to be formed of different conductor films, the gate source line 13, the source line, and the capacitor line are formed of metal films (conductor films) different from each other, so that it is concerned that manufacturing cost is high. On the other hand, when the capacitor line 26 is formed of the second metal film 21 which is the same as that of the source line 14, the number of metal films to be provided is reduced, which is effective for achieving reduction of manufacturing cost.

Embodiment 2

Embodiment 2 of the disclosure will be described with reference to FIG. 9 or 10. Embodiment 2 includes an edge light shielding portion 128 whose arrangement is changed. Note that, redundant description for a structure, an action, and an effect similar to those of Embodiment 1 described above will be omitted.

Figure 9:
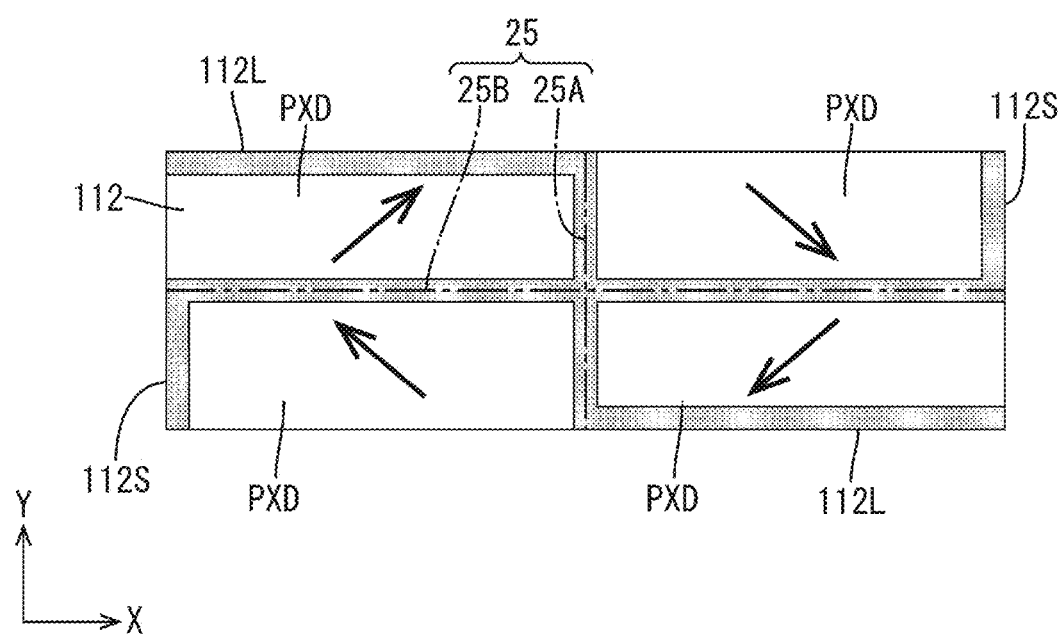
FIG. 9 is a view for explaining, for example, a tilt direction of liquid crystal molecules in one pixel portion of a liquid crystal panel according to Embodiment 2 of the disclosure.
Figure 10:
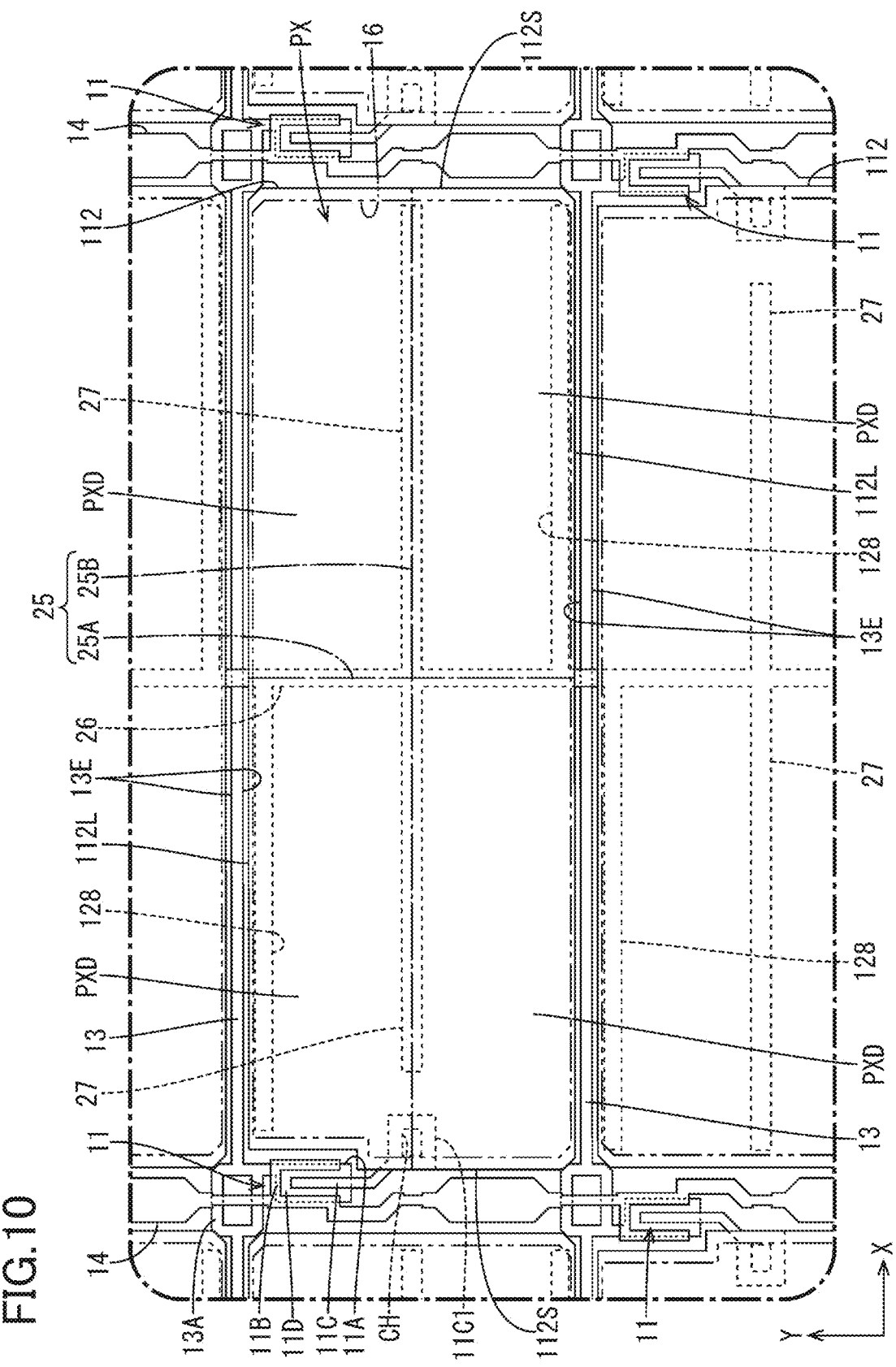
FIG. 10 is a plan view illustrating a pixel array in an array substrate constituting the liquid crystal panel.

In the present embodiment, as illustrated in FIG. 9, tilt directions of the liquid crystal molecules near the middle of the liquid crystal layer in the thickness direction when a voltage is applied to the liquid crystal layer of four domains PXD constituting pixel portions PX are set so as to be arranged differently from those of Embodiment 1. That is, the tilt direction of the liquid crystal molecules is a lower-right diagonal direction in an upper-right domain PXD illustrated in FIG. 9, the tilt direction of the liquid crystal molecules is a lower-left diagonal direction in a lower-right domain PXD illustrated in FIG. 9, the tilt direction of the liquid crystal molecules is an upper-left diagonal direction in a lower-left domain PXD illustrated in FIG. 9, and the tilt direction of the liquid crystal molecules is an upper-right diagonal direction in an upper-left domain PXD illustrated in FIG. 9. Thus, in the upper-right domain PXD illustrated in FIG. 9, an azimuthal direction that is perpendicular to a long-side edge 112L of a pixel electrode 112 and points toward an inside of the pixel electrode 112 defines an acute angle with respect to the tilt direction of the liquid crystal molecules, whereas an azimuthal direction that is perpendicular to a short-side edge 112S of the pixel electrode 112 and points toward the inside of the pixel electrode 112 defines an obtuse angle with respect to the tilt direction of the liquid crystal molecules. Similarly, in the lower-right domain PXD illustrated in FIG. 9, an azimuthal direction that is perpendicular to the long-side edge 112L of the pixel electrode 112 and points toward the inside of the pixel electrode 112 defines an obtuse angle with respect to the tilt direction of the liquid crystal molecules, whereas an azimuthal direction that is perpendicular to the short-side edge 112S of the pixel electrode 112 and points toward the inside of the pixel electrode 112 defines an acute angle with respect to the tilt direction of the liquid crystal molecules. Similarly, in the lower-left domain PXD illustrated in FIG. 9, an azimuthal direction that is perpendicular to the long-side edge 112L of the pixel electrode 112 and points toward the inside of the pixel electrode 112 defines an acute angle with respect to the tilt direction of the liquid crystal molecules, whereas an azimuthal direction that is perpendicular to the short-side edge 112S of the pixel electrode 112 and points toward the inside of the pixel electrode 112 defines an obtuse angle with respect to the tilt direction of the liquid crystal molecules. In the upper-left domain PXD illustrated in FIG. 9, an azimuthal direction that is perpendicular to the long-side edge 112L of the pixel electrode 112 and points toward the inside of the pixel electrode 112 defines an obtuse angle with respect to the tilt direction of the liquid crystal molecules, whereas an azimuthal direction that is perpendicular to the short-side edge 112S of the pixel electrode 112 and points toward the inside of the pixel electrode 112 defines an acute angle with respect to the tilt direction of the liquid crystal molecules. Note that, in FIG. 9, a region where the dark portion is generated is illustrated with shading.

In the pixel portion PX configured as described above, as illustrated in FIG. 10, the edge light shielding portion 128 is arranged so as to be overlapped with the long-side edge 112L which is included in an outer periphery of the pixel electrode 112 and in which an azimuthal direction that is perpendicular to the edge and points toward the inside of the pixel electrode 112 defines an obtuse angle with respect to the tilt direction of the liquid crystal molecules. Specifically, two edge light shielding portions 128 are arranged so as to be overlapped with the long-side edge 112L of the pixel electrode 112 in the upper-left domain PXD illustrated in FIG. 10 and the long-side edge 112L of the pixel electrode 112 in the lower-right domain PXD illustrated in FIG. 10. Such a configuration also achieves a light shielding effect and a shielding effect by the edge light shielding portions 128, similarly to Embodiment 1 described above.

Other Embodiments

The disclosure is not limited to the embodiments described above and illustrated by the drawings. For example, the following embodiments are also included in the technical scope of the disclosure.

(1) In addition to the embodiments described above, setting of the tilt direction of the liquid crystal molecules in each domain of the pixel portion is able to be appropriately changed. For example, the tilt direction of the liquid crystal molecules in four domains may be set so as to point toward the center of the pixel portion. In such a case, over an entire region of the outer periphery of the pixel electrode, an azimuthal direction which is perpendicular to an edge thereof and points toward the inside of the pixel electrode defines an acute angle with respect to the tilt direction of the liquid crystal molecules, so that the dark portion is difficult to be generated over an entire perimeter near the outer periphery. Thus, it may be said that such a configuration is suitable when the edge light shielding portion is omitted.

(2) In addition to (1) described above, the tilt direction of the liquid crystal molecules in four domains may be set so as to point toward an outside radially from the center of the pixel portion. In such a case, over the entire region of the outer periphery of the pixel electrode, an azimuthal direction which is perpendicular to an edge thereof and points toward the inside of the pixel electrode defines an obtuse angle with respect to the tilt direction of the liquid crystal molecules, so that the dark portion is easily generated over the entire perimeter near the outer periphery. In such a configuration, though it is most desirable that the edge light shielding portion is arranged so as to be overlapped with the entire perimeter of the outer periphery of the pixel electrode, it is also desirable that the edge light shielding portion is overlapped with a long-side edge of the pixel electrode over a whole length because visual recognition of the dark portion is able to be sufficiently suppressed.

(3) Though the embodiments described above indicate a case where the edge light shielding portion is arranged so as to be overlapped only with a long-side edge of the outer periphery of the pixel electrode, the edge light shielding portion may be arranged so as to be overlapped with a short-side edge of the outer periphery of the pixel electrode. In such a case, the edge light shielding portion is also able to be arranged so as to be overlapped only with the short-side edge of the outer periphery of the pixel electrode, but the edge light shielding portion is also able to be arranged so as to be overlapped with both the long-side edge and the short-side edge of the outer periphery of the pixel electrode.

Figure 11:
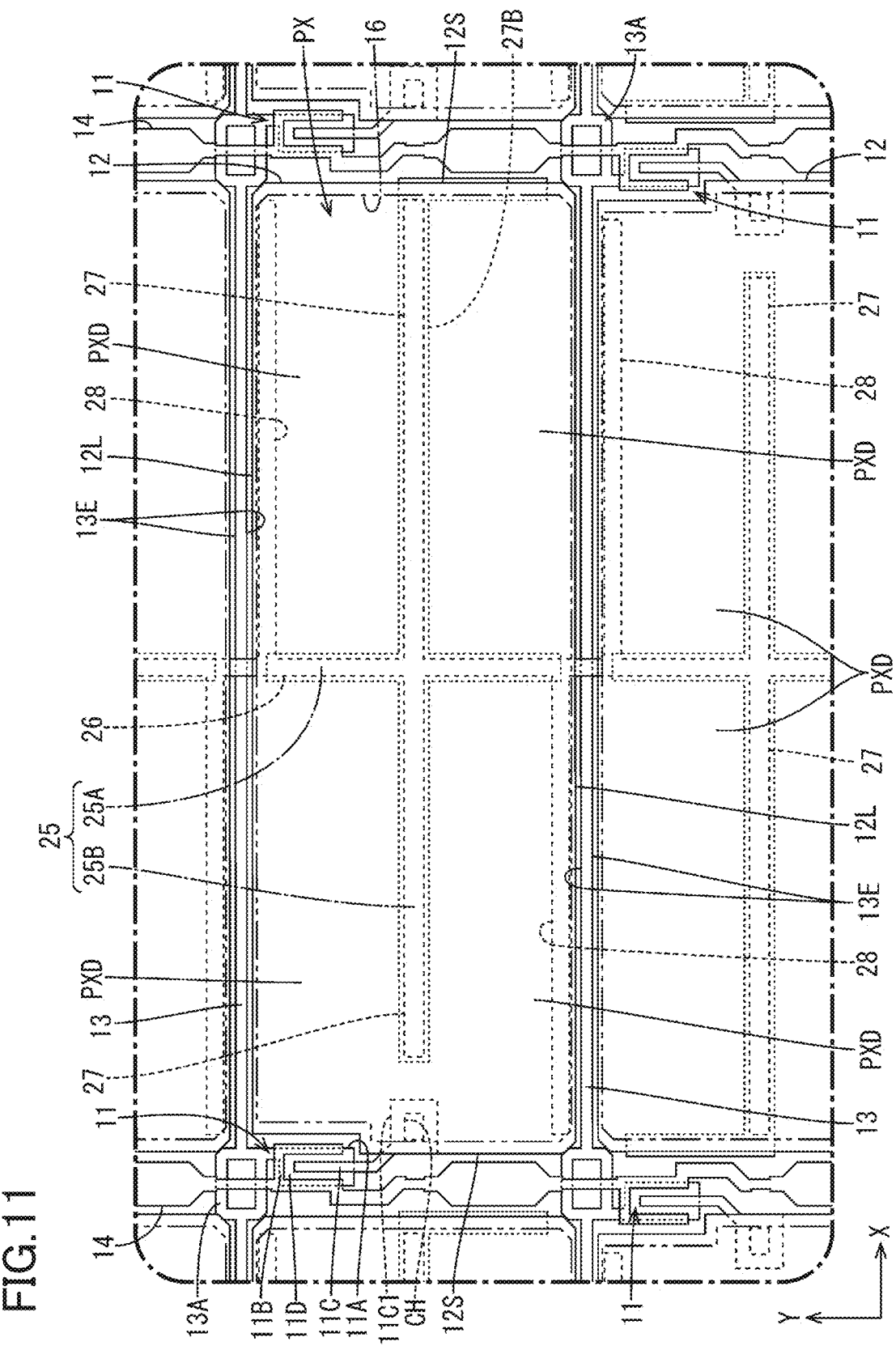
FIG. 11 is a plan view illustrating a pixel array in an array substrate constituting a liquid crystal panel according to another embodiment of the disclosure.

(4) Though the embodiments described above indicate a case where each of the light shielding portion and the edge light shielding portion is formed of the second metal film which is the same as that of the capacitor line, at least one of the light shielding portion and the edge light shielding portion may be formed of a metal film different from that of the capacitor line, a transparent electrode film, or a semiconductor film (in particular, a semiconductor film that is processed so as to achieve low resistance as compared to a semiconductor film forming the channel portion of the TFT), or may be formed in layers thereof. For example, as illustrated in FIG. 11, a second light shielding portion 27B may be formed by using a semiconductor film that is processed so as to achieve low resistance as compared to the semiconductor film forming the channel portion 11D of the TFT 11 and the second light shielding portion 27B may be continued to the light shielding portion 27 (refer to FIG. 2) described in Embodiments 1 and 2. At this time, the second light shielding portion 27B is formed in a layer directly below the light shielding portion 27 without using an insulating film so that conduction between the second light shielding portion 27B and the light shielding portion 27 is made. Note that, in order for the light shielding portion or the edge light shielding portion, which is formed of the metal film different from that of the capacitor line, to be connected to the capacitor line, a contact hole may be formed so as to be opened in the insulating film interposed between the light shielding portion or the edge light shielding portion and the capacitor line. Even when the light shielding portion or the edge light shielding portion is formed of a transparent electrode film or the like, an effect of shielding an electric field generated between the gate line or the source line and the pixel electrode is able to be obtained by increasing electrostatic capacitance.

(5) Though the embodiments described above indicate a case where both the light shielding portion and the edge light shielding portion are electrically connected to the capacitor line, at least one of the light shielding portion and the edge light shielding portion may not be electrically connected to the capacitor line. In such a case, the light shielding portion or the edge light shielding portion which is not connected to the capacitor line is also able to be formed of a metal film (conductor film) which is different from that of the capacitor line, but may be formed of the second metal film which is the same as that of the capacitor line.

(6) In addition to the embodiments described above, the light shielding portion is also able to be omitted. Similarly, the edge light shielding portion is also able to be omitted.

(7) In addition to the embodiments described above, the pixel connection portion of the drain electrode constituting the TFT may be arranged so as not to be overlapped with the second alignment boundary portion.

(8) Though the embodiments described above indicate a case where the number of domains in the pixel portion is 4, the number of domains in the pixel portion may be other than 4 (may be, for example, 2, 6, 8, or the like).

(9) Though the embodiments described above indicate a case where the alignment film is subjected to a photo alignment process so as to be a photo alignment film exerting alignment restriction force to the liquid crystal molecules, the alignment film may be a vertical alignment film that is not a photo alignment film. In this case, it is desirable that, for example, a rib (protrusion) and a slit (recess) are formed on a surface of the array substrate or the CF substrate so that alignment restriction force for the liquid crystal molecules is obtained by the rib and the slit.

(10) Though the embodiments described above indicate a case where the alignment film is provided in each of the array substrate and the CF substrate, the alignment film may be provided only in any one of the array substrate and the CF substrate.

(11) Though the embodiments described above indicate a case where the TFTs are arranged in a zigzag manner in plan view in the array substrate, the TFTs may be arranged in a matrix form in plan view.

(12) Though the embodiments described above indicate a case where the gate circuit portion is provided in the array substrate, the gate circuit portion may be omitted and a gate driver having a function similar to that of the gate circuit portion may be mounted on the array substrate.

(13) Though the embodiments described above indicate a case the driver is mounted on the array substrate by the COG method, the driver may be mounted on a flexible substrate by a COF (Chip On Film) method. In this case, the flexible substrate is mounted on the array substrate by an FOG (Film On Glass) method.

(14) Though the embodiments described above indicate a case where the semiconductor film constituting the channel portion of the TFT is formed of the oxide semiconductor, the semiconductor film may be formed of amorphous silicon. Moreover, the semiconductor film may be polysilicon, and in this case, it is desirable that the TFT is of a bottom gate type or a top gate type in which a light shielding film is provided in a lower layer (side of the array substrate where a polarizer is attached) of the channel portion.

(15) Though the embodiments described above exemplify a liquid crystal display apparatus including a liquid crystal panel of a transparent type, a liquid crystal display apparatus including a liquid crystal panel of a reflection type or a liquid crystal panel of a semi-transparent type may be provided.

The present disclosure contains subject matter related to that disclosed in Japanese Priority Patent Application JP 2019-032994 filed in the Japan Patent Office on Feb. 26, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
   a pixel that has a longitudinal shape and includes a pixel electrode;
   a switching element that includes a gate electrode, a source electrode, a drain electrode connected to the pixel electrode, and a channel portion connected to the source electrode and the drain electrode;
   a gate line that extends along a longitudinal direction of the pixel and is connected to the gate electrode to transfer a signal by which the switching element is driven;
   a source line that extends along a transverse direction of the pixel and is connected to the source electrode to transfer a signal by which the pixel electrode is charged;
   a liquid crystal layer that includes liquid crystal molecules;
   a plurality of domains that are different in alignment direction of the liquid crystal molecules when a voltage is applied to the liquid crystal layer;
   an alignment boundary portion that is positioned in a boundary of the plurality of domains;
   an alignment film that aligns the liquid crystal molecules; and
   a capacitor line that extends parallel to the source line and is arranged to be (i) overlapped with the pixel electrode with an insulating film in between, (ii) overlapped with at least a portion of the alignment boundary portion, and (iii) crossing the gate line without crossing the source line.

2. The display apparatus according to claim 1, wherein the alignment film is subjected to a plurality of alignment processes to differentiate alignment directions of the liquid crystal molecules, and a boundary of portions subjected to the plurality of alignment processes corresponds to the alignment boundary portion.

3. The display apparatus according to claim 1, further comprising
   a light shielding portion that extends along the longitudinal direction and is arranged so as to be overlapped with the second alignment boundary portion, wherein
   the alignment boundary portion includes a first alignment boundary portion that extends along the transverse direction and is overlapped with the capacitor line and a second alignment boundary portion that extends along the longitudinal direction.

4. The display apparatus according to claim 3, wherein the light shielding portion is electrically connected to the capacitor line.

5. The display apparatus according to claim 4, wherein the light shielding portion is made of a conductor film, which is identical with that of the capacitor line, and extends to the capacitor line.

6. The display apparatus according to claim 3, wherein
   the drain electrode includes a pixel connection portion that is overlapped with the second alignment boundary portion and overlapped with a portion of the pixel electrode with the insulating film in between, and is connected to the pixel electrode through a contact hole defined to be opened in the insulating film.

7. The display apparatus according to claim 4, wherein the light shielding portion is made of a conductor film, which is different from that of the capacitor line, and extends to the capacitor line.

8. The display apparatus according to claim 3, wherein the light shielding portion is not electrically connected to the capacitor line.

9. The display apparatus according to claim 1, further comprising an edge light shielding portion that is arranged to be overlapped with at least a portion of an edge which is included in an outer periphery of the pixel electrode and in which an azimuthal direction that is perpendicular to the edge and points toward an inside of the pixel electrode defines an obtuse angle with respect to a tilt direction of the liquid crystal molecules near a middle of the liquid crystal layer in a thickness direction when a voltage is applied to the liquid crystal layer.

10. The display apparatus according to claim 9, wherein the edge light shielding portion is arranged to be overlapped with at least a portion of a long-side edge which is included in the outer periphery of the pixel electrode and in which an azimuthal direction that is perpendicular to the long-side edge and points toward the inside of the pixel electrode defines an obtuse angle with respect to the tilt direction.

11. The display apparatus according to claim 10, wherein the edge light shielding portion is arranged to be overlapped with at least a portion of a short-side edge which is included in the outer periphery of the pixel electrode and in which an azimuthal direction that is perpendicular to the short-side edge and points toward the inside of the pixel electrode defines an obtuse angle with respect to the tilt direction.

12. The display apparatus according to claim 9, wherein the edge light shielding portion is electrically connected to the capacitor line.

13. The display apparatus according to claim 12, wherein the gate line is arranged not to be overlapped with the pixel electrode, and the edge light shielding portion is arranged not to be overlapped with the gate line and to be adjacent to a side edge of the gate line.

14. The display apparatus according to claim 12, wherein the edge light shielding portion is made of a conductor film, which is identical with that of the capacitor line, and extends to the capacitor line.

15. The display apparatus according to claim 12, wherein the edge light shielding portion is made of a conductor film, which is different from that of the capacitor line, and extends to the capacitor line.

16. The display apparatus according to claim 9, wherein the edge light shielding portion is not electrically connected to the capacitor line.

17. The display apparatus according to claim 1, wherein the capacitor line is made of a conductor film that is identical with that of the source line.

18. The display apparatus according to claim 1, wherein
the plurality of domains include four domains arranged in a matrix in which two domains are arranged in the longitudinal direction and two domains are arranged in the transverse direction, and
tilt directions of the liquid crystal molecules in the four domains are different from each other such that the tilt directions of the liquid crystal molecules in the two domains arranged in any one of the longitudinal direction and the transverse direction are different from each other by 90 degrees.

19. The display apparatus according to claim 1, further comprising:
a plurality of the gate lines aligned in the transverse direction; and
a plurality of the source lines aligned in the longitudinal direction, wherein
a number of the gate lines that the capacitor line crosses is less than a number of the source lines that each of the gate lines crosses.

* * * * *